Patented Oct. 14, 1924.

1,511,939

UNITED STATES PATENT OFFICE.

JOHN A. BOUGHTON, OF EVERETT, OHIO.

MOLDING SAND.

No Drawing.　　Application filed October 26, 1922.　Serial No. 597,172.

*To all whom it may concern:*

Be it known that I, JOHN A. BOUGHTON, a citizen of the United States, residing at Everett, in the county of Summit and State of Ohio, have invented certain new and useful Improvements in Molding Sand; and I do declare the following to be a full, clear, and exact description of the invention, such as will enable others skilled in the art to which it appertains to make and use the same.

This invention for improvements in molding sand relates to a molding sand designed to be used in making castings, and has been devised in order to provide a very high grade molding sand capable to producing unusually smooth and perfect castings.

According to the invention, each of the particles or grains of the sand is coated with a bonding material. In this way, the bonding material is uniformly distributed throughout the mass of sand, so that unusually smooth and perfect castings may be made by using it.

The improved sand may be made in various manners, but hereinafter there is disclosed a preferred process or method for producing the same.

In producing a sand according to the principles of the invention a sharp sand, high in silica and of uniform grade should be selected as the base. The bond may be made of a clay which is high in silica, sesqui-oxide of iron, and alumina, but low in lime, alkalies and other undesirable substances, and having a high fusing point.

According to the process, the clay which is selected for the bond should be mixed with water so as to form a thin clay paste. This clay paste and the base sand should then be mixed together in suitable proportions and thoroughly agitated so as to cause each particle or grain of the base sand to take up and become entirely coated by a small amount of the clay paste.

The molding-sand produced by the above-described process possesses the highly desirable qualities of being uniform, porous, plastic, refractory and durable, and has a high fusing point. It is greatly superior to a purely milled molding-sand, in which the bonding material is scattered nonuniformly throughout the base sand and which produces rough and scabby castings and interferes with the vent in the mold.

It is obvious that various grades of the improved molding-sand can be made by selecting various grades of the base sand. It will be stated, however, that some grades of sand will require mica flakes to be added to the clay paste to produce the desired results.

From the foregoing description the nature of the invention and mode of carrying it out will be understood by persons skilled in the art to which the invention appertains.

Therefore, what is desired to secure by Letters Patent is:—

As an article of manufacture, a high grade molding-sand, comprising a base sand which is high in silica and of a uniform grade, each grain of said base sand being coated with clay which is high in silica, sesqui-oxide of iron, and alumina, but which is low in lime and alkalies.

In testimony whereof I have hereunto affixed my signature.

JOHN A. BOUGHTON.